United States Patent
Setsuda (10) Patent No.: US 9,399,289 B2
(45) Date of Patent: Jul. 26, 2016

(54) ROBOT CONTROL APPARATUS AND ROBOT SYSTEM

(75) Inventor: Nobuyuki Setsuda, Okaya (JP)

(73) Assignee: Seiko Epson Corporation (JP)

( * ) Notice: Subject to any disclaimer, the term of this patent is extended or adjusted under 35 U.S.C. 154(b) by 347 days.

(21) Appl. No.: 13/609,823

(22) Filed: Sep. 11, 2012

(65) Prior Publication Data

US 2013/0073091 A1   Mar. 21, 2013

(30) Foreign Application Priority Data

Sep. 21, 2011   (JP) ................................. 2011-206308

(51) Int. Cl.
*G05B 19/04*   (2006.01)
*B25J 9/16*   (2006.01)

(52) U.S. Cl.
CPC ..... *B25J 9/1602* (2013.01); *G05B 2219/39369* (2013.01)

(58) Field of Classification Search
USPC ......... 700/245, 248, 250–257, 247, 249, 258, 700/259; 318/568.1, 568.12; 901/2, 4, 43
See application file for complete search history.

(56) References Cited

U.S. PATENT DOCUMENTS

| | | | |
|---|---|---|---|
| 5,483,440 A | 1/1996 | Aono et al. | |
| 6,459,995 B1 * | 10/2002 | Collister | ........................ 702/23 |
| 7,187,998 B2 * | 3/2007 | Okamoto et al. | ............. 700/245 |
| 7,209,803 B2 * | 4/2007 | Okamoto et al. | ............. 700/245 |
| 7,693,757 B2 * | 4/2010 | Zimmerman | ................... 705/28 |
| 2005/0103767 A1 * | 5/2005 | Kainec | ..................... B23K 9/10 219/130.5 |
| 2006/0279246 A1 | 12/2006 | Hashimoto et al. | |
| 2007/0124024 A1 * | 5/2007 | Okamoto et al. | ............. 700/245 |
| 2007/0156286 A1 * | 7/2007 | Yamauchi | ..................... 700/245 |
| 2007/0239315 A1 * | 10/2007 | Sato et al. | ..................... 700/245 |
| 2007/0250212 A1 * | 10/2007 | Halloran | .................... A47L 5/30 700/245 |
| 2008/0071403 A1 * | 3/2008 | Conway | ............. B23K 26/0639 700/97 |
| 2009/0216910 A1 * | 8/2009 | Duchesneau | ......... G06F 9/5072 709/250 |
| 2009/0259612 A1 * | 10/2009 | Hanson | ................... H04L 69/32 706/47 |
| 2013/0031037 A1 * | 1/2013 | Brandt | ................ H04L 63/1408 706/12 |
| 2013/0073091 A1 * | 3/2013 | Setsuda | .................. B25J 9/1602 700/259 |
| 2015/0081043 A1 * | 3/2015 | Kim | ....................... G05B 15/02 700/19 |

FOREIGN PATENT DOCUMENTS

| | | |
|---|---|---|
| CN | 1876332 A | 12/2006 |
| JP | H10-136340 A | 5/1998 |
| JP | 2004-276186 A | 10/2004 |
| JP | 2006-033428 A | 2/2006 |
| JP | 2006-345240 A | 12/2006 |
| JP | 2009-178813 | 8/2009 |

* cited by examiner

*Primary Examiner* — Ronnie Mancho
(74) *Attorney, Agent, or Firm* — Harness, Dickey & Pierce, P.L.C.

(57) ABSTRACT

A robot control apparatus, which controls motions of an industrial robot based on processing results of an image processing apparatus which images the robot or objects around the robot, includes: a first communication unit which communicates with a computer for development as an external computer; a second communication unit which is connected to the image processing apparatus via a network; and a command processing unit which opens a communication port of the second communication unit and causes the second communication unit to start communication with the image processing apparatus via a server on the network in response to an open command received by the first communication unit.

9 Claims, 4 Drawing Sheets

ROBOT CONTROL APPARATUS AND ROBOT SYSTEM

BACKGROUND

1. Technical Field

The present invention relates to a robot control apparatus which controls motions of an industrial robot, particularly to a robot control apparatus which includes a plurality of communication units for communicating with each of a plurality of peripheral devices, and a robot system which includes such a robot control apparatus and an image processing apparatus as an example of the peripheral devices.

2. Related Art

Figure 4:
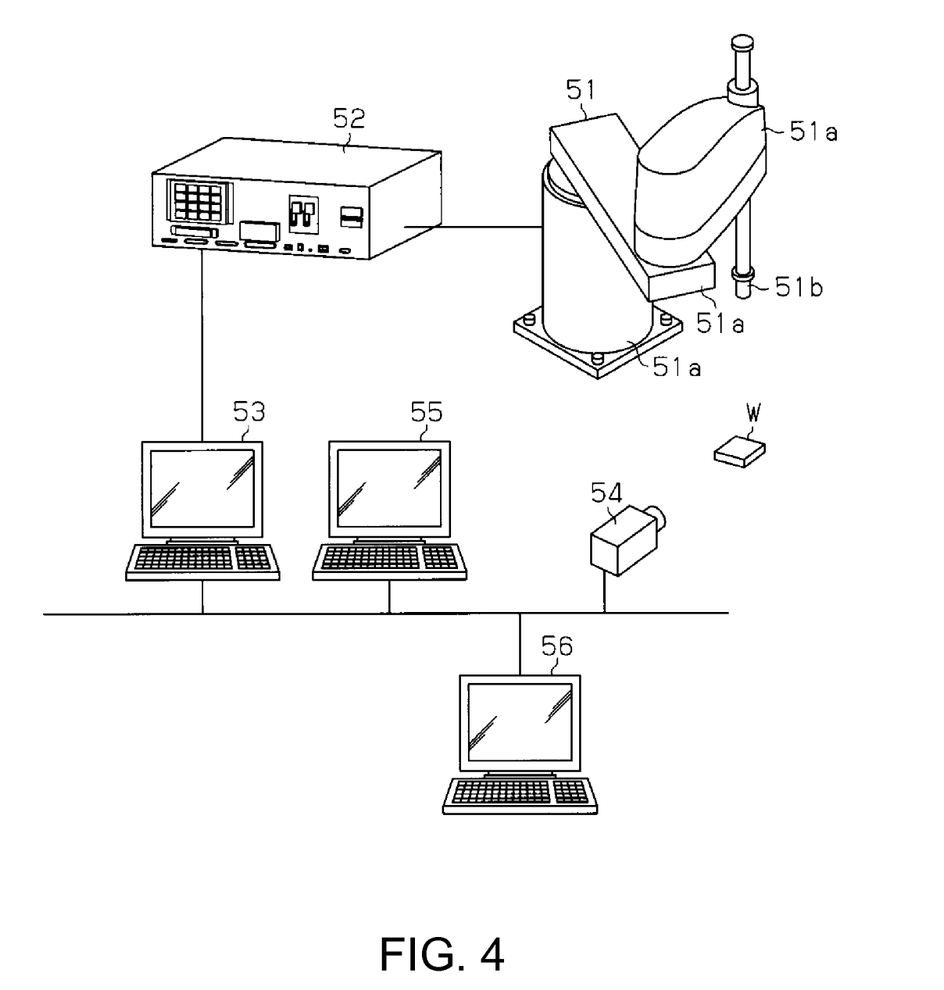
FIG. 4 is a block diagram showing a connection state of components included in a robot system according to an example of the related art.

In a robot system as described above, an image processing apparatus generates positional information on a position of an industrial robot, a work position, and the like based on an image of the industrial robot or a peripheral image of the industrial robot, and a robot control apparatus receives the positional information and controls motions of the industrial robot, as disclosed in JP-A-2009-178813. For example, the image processing apparatus causes an imaging unit to take a peripheral image of the industrial robot in response to an imaging command input to the image processing apparatus and saves data of the image taken by the imaging unit on an image memory. In addition, the image processing apparatus executes predetermined image processing in response to a processing command input to the image processing apparatus. As examples of image processing results, a work position, a work shape, and an end effecter position, and the like are calculated. Then, the image processing apparatus transmits the positional information to the robot control apparatus in response to a reception request command input to the image processing apparatus, and the robot control apparatus controls the motions of the industrial robot based on the positional information. Meanwhile, various control programs executed by the robot control apparatus and the image processing apparatus are generally developed in advance by an external computer for development in accordance with an environment where the robot system is operated, before such motion control for the industrial robot. FIG. 4 is a block diagram showing a connection state between each apparatus and the computer for development when each of the control programs in the robot control apparatus and the image processing apparatus is developed.

As shown in FIG. 4, an industrial robot 51 included in the robot system is a multi-joint robot in which a plurality of arms 51a is coupled by joint units, for example, and a robot control apparatus 52 which controls the drive of the motor mounted on the industrial robot 51 is connected to the industrial robot 51. A computer 53 for development connected to a network such as Ethernet (registered trademark) is connected to the robot control apparatus 52 via a communication path such as a USB (Universal Serial Bus) cable or the like. When a control program for controlling the drive of the motor is created, for example, the robot control apparatus 52 transmits a rotation position of the motor to the computer 53 for development, and orientation of the robot is displayed on the computer 53 for development. Then, the computer 53 for development creates a control program for determining a position and orientation of the robot, and the robot control apparatus 52 stores the control program.

Meanwhile, the image processing apparatus 54 included in the robot system includes an imaging unit such as a smart camera and an image processing device which performs predetermined image processing in an image taken by the imaging unit. Another computer 55 for development, which is also connected to a network such as Ethernet, is connected to the image processing apparatus 54 via a server 56. Generally, the image processing apparatus 54 and the server 56 are configured to have a single case body in many cases. When a control program for controlling various image states is created, for example, the image processing apparatus 54 transmits image processing results by an end effecter 51b and a work w to the computer 55 for development. Then, the computer 55 for development creates a control program based on the image processing results, and the image processing apparatus 54 stores the control program.

Incidentally, in the above connection state where the computers 53 and 55 for development function as controllers in an upper stage, the computer 53 for development creates the control program for controlling the drive of the motor while another computer 55 for development creates the control program for controlling image processing states. For this reason, when various control programs for controlling the drive of the robot system are developed, a plurality of different computers for development are required, and it is necessary to separately secure communication paths for developing the control programs. Therefore, development of such various control programs including communication setting for the computers for development becomes complicated.

SUMMARY

An advantage of some aspects of the invention is to provide a robot control apparatus, which is capable of simplifying connection states and setting of various apparatuses in developing control programs for controlling drive of a robot system, and a robot system which includes such a robot control apparatus.

An aspect of the invention is directed to a robot control apparatus which controls motions of a robot based on processing results of an image processing apparatus, the image processing apparatus imaging the robot or objects around the robot, the robot control apparatus including: a first communication unit which communicates with an external computer; a second communication unit which is connected to the image processing apparatus via a network; and a command processing unit which opens a communication port of the second communication unit and causes the second communication unit to start communication with the image processing apparatus via a server on the network in response to an open command received by the first communication unit.

In the robot control apparatus according to the aspect of the invention, the communication port of the second communication unit in the robot control apparatus is opened in response to the open command transmitted from the external computer, such that the communication between the robot control apparatus and the image processing apparatus is possible. For this reason, the communication between the external computer and the image processing apparatus via the robot control apparatus becomes possible. According to such a connection state, it is possible to realize creation of a control program using the robot control apparatus and creation of a control program using the image processing apparatus with one external computer. Therefore, a communication path may be secured for only one external computer for creating such control programs. For this reason, it is possible to simplify connection states and setting of various apparatuses in developing the control programs for controlling the motions of the robot.

Another aspect of the invention is directed to the robot control apparatus, wherein the robot control apparatus further includes a data buffer which stores image processing data sent from the second communication unit every time the second communication unit receives the image processing data transmitted from the image processing apparatus and accumulates image processing data groups received over a plurality of times, and the command processing unit receives a reception request command received by the first communication unit and cause the first communication unit to transmit the image processing data group accumulated in the data buffer. The communication speed between the first communication unit and the external computer is often lower than the communication speed between the second communication unit and the image processing apparatus. In addition, the communication cycle between the first communication unit and the external computer is often longer than the communication cycle between the second communication unit and the image processing apparatus. In the data transfer state in which the image processing data received by the second communication unit is transmitted from the first communication unit at each reception cycle, a part of the image processing data received by the second communication unit over a plurality of times is not easily transmitted from the first communication unit if the communication speeds and the communication cycles are different as described above. In this regard, in the robot control apparatus according to the aspect of the invention, the data buffer accumulates the image processing data groups received over a plurality of times, and the first communication unit transmits the image processing data groups accumulated in the data buffer to the external computer. For this reason, it is possible to suppress the fact that the image processing data received by the second communication unit at a predetermined reception cycle is not easily transmitted from the first communication unit when the communication speeds and the communication cycles are different as described above.

Still another aspect of the invention is directed to the robot control apparatus, wherein the first communication unit includes a slave device serving for the external computer as a host.

In the robot control apparatus according to the aspect of the invention, the external computer communicates with the robot control apparatus using a slave device serving for the external computer as a host, and therefore, setting relating to the communication between the external computer and the robot control apparatus is more simply made.

Yet another aspect of the invention is directed to the robot control apparatus, wherein the first communication unit includes a USB device, and the second communication unit includes a LAN device.

In the robot control apparatus according to the aspect of the invention, the robot control apparatus has communication devices based on different communication schemes, it is possible to enhance convenience in creating a control program for the robot control apparatus and widen the variety of the communication schemes of the robot control apparatus itself.

Still yet another aspect of the invention is directed to a robot system including: an image processing apparatus which images a robot or objects around the robot; and a robot control apparatus which controls motions of the robot based on processing results of the image processing apparatus, wherein the robot control apparatus includes a first communication unit which communicates with an external computer, a second communication unit which is connected to the image processing apparatus via a network, and a command processing unit which opens a communication port of the second communication unit and causes the second communication unit to start communication with the image processing apparatus via the server on the network in response to an open command received by the first communication unit.

In the robot system according to the aspect of the invention, the communication port of the second communication unit in the robot control apparatus is opened in response to the open command transmitted from the external computer, such that the communication between the robot control apparatus and the image processing apparatus is started. For this reason, the communication between one external computer and the image processing apparatus via the robot control apparatus becomes possible. In such a connection state, it is possible to realize creation of the control program using the robot control apparatus and creation of the control program using the image processing apparatus with one external computer. Therefore, a communication path may be secured for only one external computer for creating such control programs. For this reason, it is possible to simplify connection states and setting of various apparatuses in developing the control programs for controlling the motions of the robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
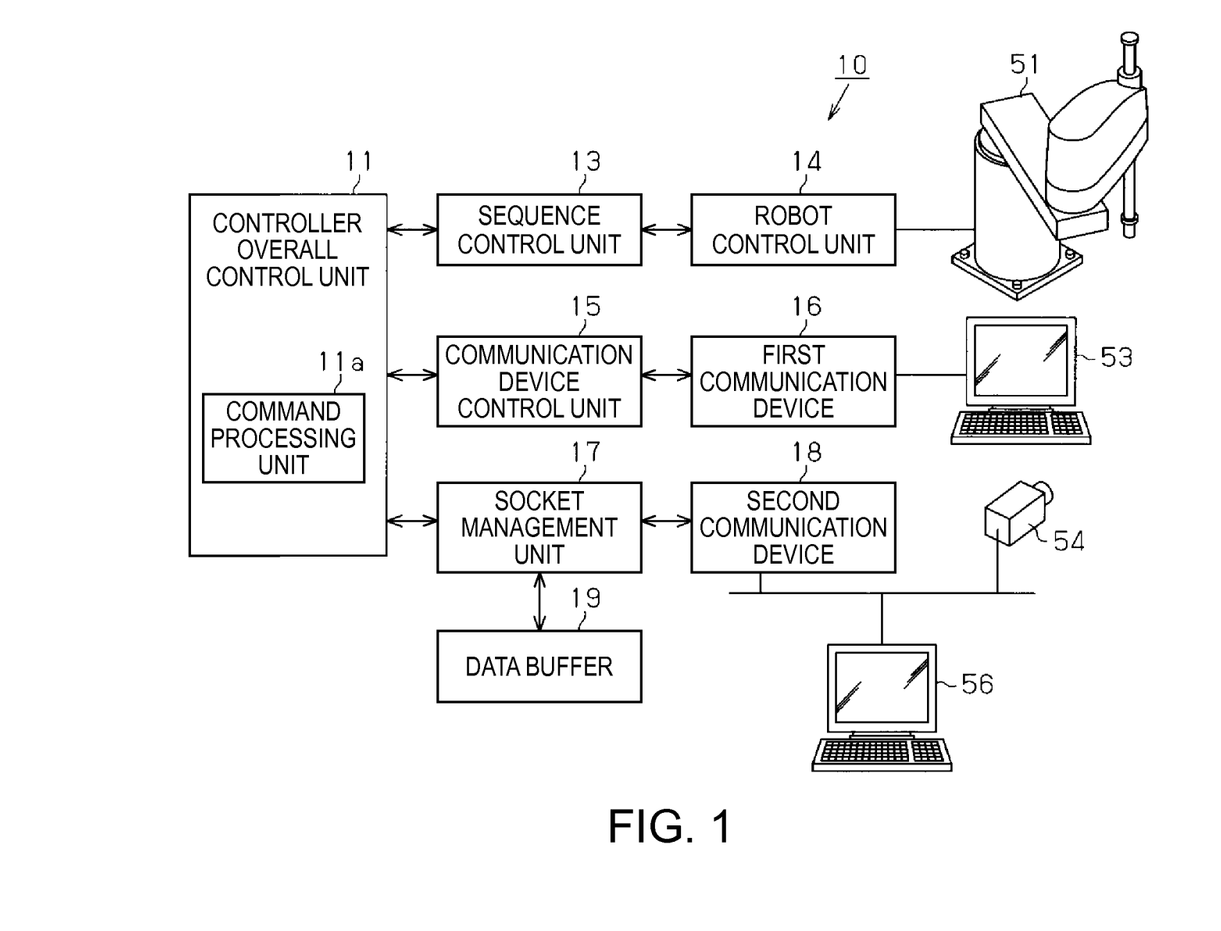
FIG. 1 is a functional block diagram showing a connection state of components and a functional configuration of a robot control apparatus as one of the components in a robot system according to an embodiment of the invention.
Figure 2:
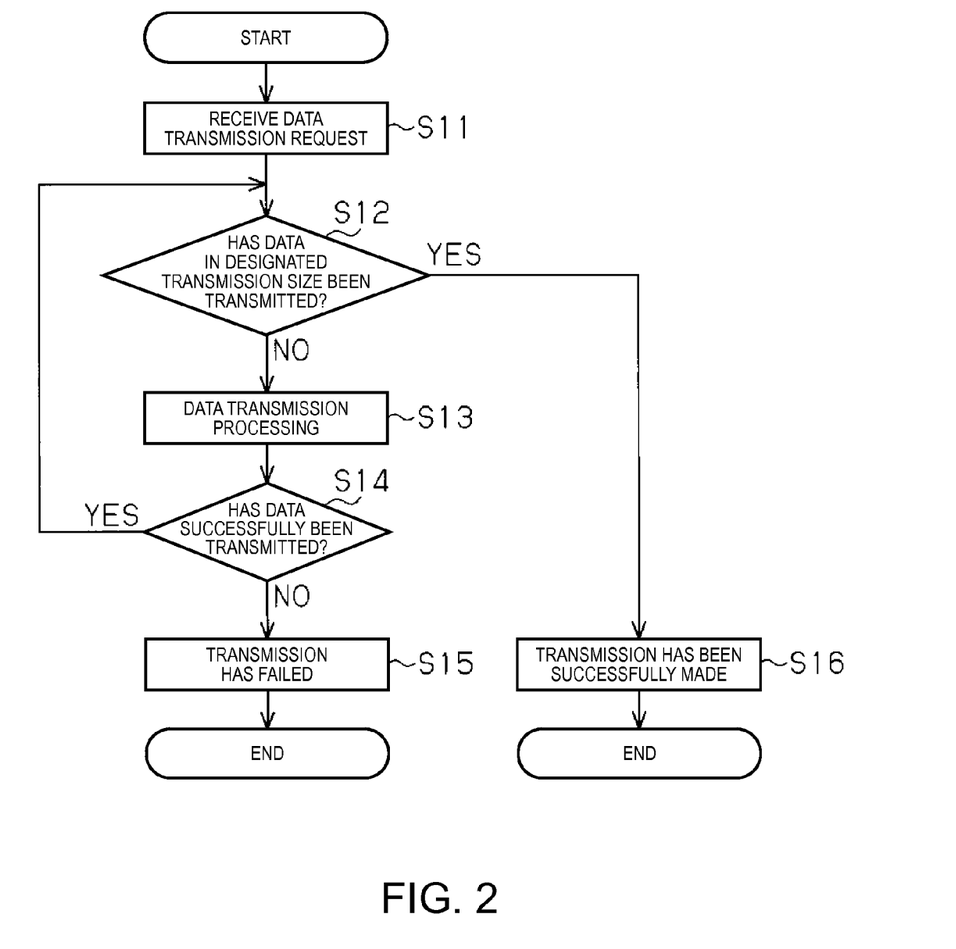
FIG. 2 is a flowchart showing a processing procedure of socket transmission processing performed by the robot control apparatus according to the embodiment.
Figure 3:
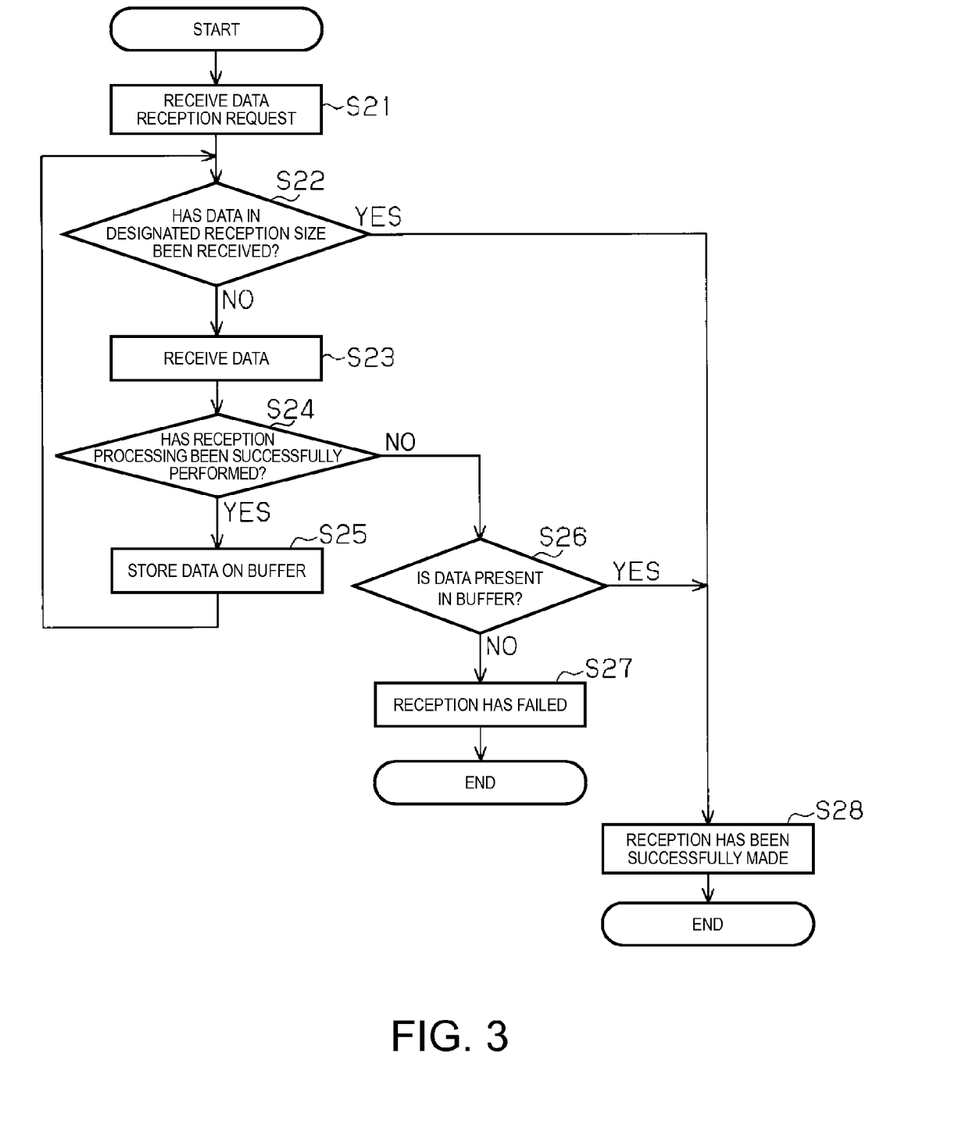
FIG. 3 is a flowchart showing a processing procedure of socket reception processing performed by the robot control apparatus according to the embodiment.

Hereinafter, description will be given of a robot control apparatus and a robot system according to an embodiment of the invention with reference to FIGS. 1 to 3. First, description will be given of a connection state between each apparatus and a computer for development as an external computer in developing a control program to be executed by the robot control apparatus and a control program to be executed by an image processing apparatus, as well as a configuration of the robot control apparatus with reference to FIG. 1.

Configuration of Robot System

The industrial robot 51, the computer 53 for development, and the image processing apparatus 54, which are described above with reference to FIG. 4, are separately connected to a robot control apparatus 10 included in the robot system.

Various communication commands for the robot control apparatus 10 communicating with peripheral devices and various commands for the robot control apparatus 10 moving the industrial robot 51 are defined in a command processing unit 11a of a controller overall control unit 11 included in the robot control apparatus 10. The controller overall control unit 11 causes the command processing unit 11a to interpret a command input to the controller overall control unit 11 and executes processing corresponding to the command.

A sequence control unit 13 controls an order of operations executed by the industrial robot 51 such as holding, transporting, placing, passing of a work, and shifting between such operations by the industrial robot 51. Then, the sequence control unit 13 sequentially creates an operation instruction and outputs the operation instruction to a robot control unit 14 so as to cause the industrial robot 51 to operate in the order in accordance with an instruction from the controller overall control unit 11.

The robot control unit 14 creates a positional instruction in accordance with the operation instruction output from the sequence control unit 13, based on a rotation position of the motor mounted on the industrial robot 51 and a target position of the motor. Then, the robot control unit 14 creates drive current in accordance with the positional instruction and supplies the drive current to the motor mounted on the industrial robot 51.

A first communication device 16 is a USB device as one of slave devices and functions as an electrical interface with a USB bus for the computer 53 for development. A communication device control unit 15 is a USB controller as an interface with the controller overall control unit 11 and defines a data format in units of transmission, a data format in units of reception, an error detection method, and the like. In addition, the first communication device 16 and the communication device control unit 15 configure a first communication unit.

When the first communication device 16 is connected to the USB bus for the computer 53 for development, the communication device control unit 15 initializes state shifting of the first communication device 16. Then, the communication device control unit 15 informs the computer 53 for development of a function of the first communication device 16 and causes the computer 53 for development to correctly recognize the first communication device 16. For example, the communication device control unit 15 informs the computer 53 for development of a transfer mode defined by the communication device control unit 15. In so doing, the computer 53 for development recognizes the transfer mode, and the transfer mode between the computer 53 for development and the robot control apparatus 10 is then fixed. In addition, the communication device control unit 15 responds to an inquiry for requesting processing executed by the computer 53 for development and transmits data when predetermined conditions are satisfied.

A second communication device 18 is an Ethernet device connected to the server 56 via an Ethernet network and functions as a network interface with the Ethernet network. A socket management unit 17 is an interface with the controller overall control unit 11 and manages a socket in response to an instruction from the command processing unit 11a which interprets various commands. A data buffer 19 stores image processing data, which has been received by the second communication device 18, based on determination of the socket management unit 17 and accumulates image processing data groups received over a plurality of times. The second communication device 18 and the socket management unit 17 configure a second communication unit.

When the computer 53 for development transmits a data transmission request to the robot control apparatus 10, the socket management unit 17 causes the command processing unit 11a to process an open command included in the data transmission request to open a communication port of the second communication device 18 in response to the instruction of the command processing unit 11a. That is, the socket management unit 17 brings the second communication device 18 and the image processing apparatus 54 into a state where communication can be started therebetween. Before the instruction of the command processing unit 11a is output to the second communication device 18, the communication port is generally closed, and the communication between the second communication device 18 and the image processing apparatus 54 is not established merely by opening the communication port from the closed state. In establishing the communication between the second communication device 18 and the image processing apparatus 54, the communication port of the second communication device 18 is first opened, and the robot control apparatus 10 designates a designated port of the server 56 via the second communication device 18, such that the robot control apparatus 10 and the image processing apparatus 54 are connected to each other and communication therebetween is started. That is, the socket management unit 17 creates a socket including an IP address of the robot control apparatus 10 and a port number of the communication port. Subsequently, the socket management unit 17 requests connection to the server using the created socket and establishes connection with the server. Then, the socket management unit 17 exchanges data with the server 56 via the socket for which connection has been thus established.

Actions of Robot System

Next, description will be given of socket transmission processing and socket reception processing in the robot control apparatus 10, which are performed in developing the aforementioned control program executed by the robot control apparatus 10 and the control program executed by the image processing apparatus 54, with reference to FIGS. 2 and 3. In addition, the aforementioned creation of the control program is started when the computer 53 for development reads an application program for the creation and executes the application program.

First, description will be given of the socket transmission processing performed by the robot control apparatus 10 with reference to FIG. 2. As shown in FIG. 2, the computer 53 for development transmits a data transmission request, which is for requesting the server 56 to transmit image processing data to the robot control apparatus 10, to the first communication device 16 via the USB. On this occasion, the communication device control unit 15 processes the data reception request received by the first communication device 16 and outputs an open command and an operation command included in the data reception request to the command processing unit 11a.

The command processing unit 11a interprets the open command output by the communication device control unit 15 and causes the socket management unit 17 to open the communication port of the second communication device 18. Further, the socket management unit 17 creates a socket using a port number of the opened communication port and an IP address given to the robot control apparatus 10 and connects the robot control apparatus 10 to the server 56 (Step S11). Then, if the connection between the robot control apparatus 10 and the server 56 is established, the command processing unit 11a interprets an operation command output by the communication device control unit 15, drives the industrial robot 51 via the sequence control unit 13 and the robot control unit 14, and drives the image processing apparatus 54 via the second communication device 18.

According to such a configuration, the communication port of the second communication device in the robot control apparatus 10 is opened in response to the open command transmitted from the computer 53 for development, and the communication between the robot control apparatus 10 and the image processing apparatus 54 becomes possible. For this reason, the communication between the computer 53 for development and the image processing apparatus 54 becomes possible via the robot control apparatus 10. That is, it is possible to realize creation of the control program using the robot control apparatus 10 and creation of the control program using the image processing apparatus 54 in one computer 53 for development. For this reason, only one communication path may be secured for the computer 53 for development in order to create such control programs.

Next, the communication device control unit 15 processes a data transmission request which has been received by the first communication device 16 and transfers a transmission command to the command processing unit 11a, and the command processing unit 11a interprets the transmission command and causes the socket management unit 17 to execute the following processing. That is, the socket management unit 17 obtains a volume of the image processing data or the image processing data groups stored on the data buffer 19 from the data buffer 19 and determines whether or not the image processing data has been transmitted in the volume designated by the computer 53 for development (Step S12). Then, if the image processing data stored on the data buffer 19 has been transmitted in the volume designated in advance, the socket management unit 17 causes the first communication device 16 to transmit via the controller overall control unit 11 and the communication device control unit 15 a response representing that the image processing data has been successfully transmitted (Step S16). On the other hand, when the image processing data stored on the data buffer 19 has not been transmitted in the volume designated in advance, the socket management unit 17 transmits to the server 56 a packet representing an image processing data transmission request (Step S13). Then, the socket management unit 17 determines whether or not the packet has been successfully transmitted and transmits a packet representing that the data transmission request this time has been failed to the first communication device 16 via the controller overall control unit 11 and the communication device control unit 15 when the packet transmission has been failed. On the other hand, when the packet has been successfully transmitted to the server 56, the socket management unit 17 obtains the volume of the image processing data groups stored on the data buffer 19 again, and thereafter, repeats transmission (Step S13) of the packet to the server 56 and determination (Step S14) on whether or not the transmission has been successfully made, until the volume of the image processing data groups reaches the designated volume.

Next, description will be given of the socket reception processing performed by the robot control apparatus 10 with reference to FIG. 3. As shown in FIG. 3, the computer 53 for development first transmits a data reception request to the first communication device 16 (Step S21). Then, the socket management unit 17 obtains the volume of the image processing data groups stored on the data buffer 19 from the data buffer 19 and determines whether or not the volume of the stored image processing data groups is smaller than the volume designated by the computer 53 for development (S22). That is, the socket management unit 17 determines whether or not the image processing data groups stored on the data buffer 19 is in the volume in which the image processing data groups should be transmitted to the computer 53 for development. Then, when the volume of the image processing data groups stored on the data buffer 19 meets the volume designated in advance, the socket management unit 17 causes the first communication device 16 to transmit via the controller overall control unit 11 and the communication device control unit 15 information representing that the stored image processing data group has been successfully received (Step S28).

On the other hand, when the volume of the image processing data or the image processing data groups stored on the data buffer 19 does not meet the volume designated in advance, the socket management unit 17 requests a packet including the image processing data to the server 56 and receives the packet therefrom (Step S23). Then, the socket management unit 17 determines whether or not the packet has been successfully received and determines whether or not the image processing data is stored on the data buffer 19 when the packet reception has been failed (Step S26). When the data buffer 19 does not store the image processing data thereon, the socket management unit 17 causes the first communication device 16 to transmit via the controller overall control unit 11 and the communication device control unit 15 a packet representing that the processing in response to the data reception request has been failed this time. On the other hand, when the data buffer stores the image processing data thereon, the socket management unit 17 causes the first communication device 16 to transmit via the controller overall control unit 11 and the communication device control unit 15 the image processing data or the image processing data groups stored on the data buffer 19.

On the other hand, when the packet has been successfully received from the server 56, the socket management unit 17 processes the received packet and stores the image processing data included in the packet on the data buffer 19 (Steps S24 and S25). Then, the socket management unit 17 obtains the volume of the image processing data groups stored on the data buffer 19 again, and thereafter, repeats reception (Step S23) of the packet from the server 56, the determination (Step S24) on whether or not the reception has been successfully made, and storage (Step S25) of the received image processing data, until the volume of the image processing data reaches the designated volume.

On this occasion, a communication speed between the first communication device 16 and the computer 53 for development often becomes lower than a communication speed between the second communication device 18 and the image processing apparatus 54. In addition, a communication cycle between the first communication device 16 and the computer 53 for development often becomes longer than a communication cycle between the second communication device 18 and the image processing apparatus 54. In a data transfer mode in which the image processing data received by the second communication device 18 is transmitted from the first communication device 16 every reception cycle, a part of the image processing data received by the second communication device 18 over a plurality of times is not easily transmitted from the first communication device 16 if the communication speeds and the communication cycles are different as described above.

Meanwhile, according to the communication mode as described above, the data buffer 19 accumulates image processing data received over a plurality of times, and the first communication device 16 transmits the image processing data accumulated in the data buffer 19 to the computer 53 for development. For this reason, it is possible to suppress the above fact in that the image processing data received by the second communication device 18 at a predetermined reception cycle is no easily transmitted from the first communication device 16 when the communication speeds and the communication cycles are different as described above.

According to the above embodiment, the following effects can be achieved.

(1) The communication between one computer 53 for development and the image processing apparatus 54 can be established via the robot control apparatus 10. With such a connection state, it is possible to realize creation of the control program for the robot control apparatus 10 and creation of the control program for the image processing apparatus 54 with one computer 53 for development. For this reason, only one communication path may be secured for the computer 53 for development in order to create such programs. Therefore, it is possible to simplify connection states and setting of various apparatuses in developing programs for controlling motions of the industrial robot 51.

(2) The data buffer 19 accumulates image processing data received over a plurality of times, and the first communication device 16 transmits the image processing data accumulated in the data buffer 19 to the computer 53 for development. For this reason, it is possible to suppress the fact in that the image processing data received by the second communication device 18 is not easily transmitted from the first communication device 16 when the communication speed between the robot control apparatus 10 and the computer 53 for development is different from the communication speed between the robot control apparatus 10 and the image processing apparatus 54. In addition, it is possible to achieve the same effect even when the communication cycle between the robot control apparatus 10 and the computer 53 for development is different from the communication cycle between the robot control apparatus 10 and the image processing apparatus 54.

(3) Since the computer 53 for development communicates with the robot control apparatus 10 via the first communication device 16 serving for the computer 53 for development as a host, setting of the devices relating to the communication between the computer 53 for development and the robot control apparatus 10 is further simplified.

(4) Since the robot control apparatus 10 includes two communication devices 16 and 18 based on different communication schemes, it is possible to enhance convenience in creating the control program in the robot control apparatus 10 and in creating the control program in the image processing apparatus 54, and further, widen the variety of the communication schemes for the robot control apparatus 10 itself.

In addition, the above embodiment can be modified as follows. It is possible to use any wireless LAN such as 10 Base-T or 100 Base-T as well as the Ethernet for various industries for the communication between the robot control apparatus 10 and the image processing apparatus 54 as long as the communication scheme makes the communication between the robot control apparatus 10 and the image processing apparatus 54 via the server possible. Even with such a configuration, it is possible to achieve the above effects (1) to (4).

It is possible to use SATA (Serial Advanced Technology Attachment), SAS (Serial Attached Small computer system interface), RS-232C, IEEE 1394 or the like for the communication between the computer 53 for development and the robot control apparatus 10. Even with such a configuration, it is possible to achieve the above effects (1) to (4). It is possible to use the aforementioned various kinds of Ethernet for the communication between the computer 53 for development and the robot control apparatus 10, and in short, any configuration is applicable as long as the command processing unit in the robot control apparatus 10 interprets an open command received by the first communication unit, opens the communication port of the second communication unit, and causes the second communication unit to start the communication with the image processing apparatus via the server on the network. With such a configuration, it is also possible to shorten the communication cycle between the computer 53 for development and the robot control apparatus 10 in addition to the above effects (1) to (3).

Another configuration is also applicable in which the data buffer 19 is omitted and the first communication unit transmits the image processing data to the computer 53 for development every time the second communication unit receives the image processing data. Even with such a configuration, it is possible to achieve the above effects (1), (3), and (4).

The entire disclosure of Japanese Patent Application No. 2011-206308, filed Sep. 21, 2011 is expressly incorporated by reference herein.

What is claimed is:

1. A robot control apparatus which controls motions of a robot based on processing results of an image processing apparatus, the image processing apparatus imaging the robot or objects around the robot, the robot control apparatus comprising:
   a first communication unit which communicates with an external computer; the first communication unit being configured to output an open command;
   a second communication unit which is connected to the image processing apparatus via a network with a communication port;
   a command processing unit that is configured to control a communication port of the second communication unit based on the open command and that is configured to perform communication with the image processing apparatus; and
   a socket management unit that is configured to receive an instruction corresponding to the open command from the command processing unit to open the communication port and that is configured to connect the robot control apparatus to the image processing apparatus via the network by using a port number of the communication port and an IP address of the robot control apparatus when the communication port is open, wherein
   a first communication speed between the first communication unit and the external computer is slower than a second communication speed between the second communication unit and the image processing apparatus, and
   a first communication cycle between the first communication unit and the external computer is larger than a second communication cycle between the second communication unit and the image processing apparatus.

2. The robot control apparatus according to claim 1, further comprising:
   a data buffer which stores image processing data sent from the second communication unit every time the second communication unit receives the image processing data transmitted from the image processing apparatus and accumulates image processing data groups received over a plurality of times,
   wherein the command processing unit receives a reception request command received by the first communication unit and causes the first communication unit to transmit the image processing data group accumulated in the data buffer.

3. The robot control apparatus according to claim 1, wherein the first communication unit includes a slave device serving for the external computer as a host.

4. The robot control apparatus according to claim 2, wherein the first communication unit includes a slave device serving for the external computer as a host.

5. The robot control apparatus according to claim 1, wherein the first communication unit includes a USB device, and
   wherein the second communication unit includes a LAN device.

6. The robot control apparatus according to claim 2, wherein the first communication unit includes a USB device, and wherein the second communication unit includes a LAN device.

7. The robot control apparatus according to claim 3,
wherein the first communication unit includes a USB device, and
wherein the second communication unit includes a LAN device.

8. The robot control apparatus according to claim 1,
wherein the second communication unit is capable of communicating with a server via the network and is connected to the image processing apparatus when the command processing unit designates a port of the server.

9. A robot system comprising:
an image processing apparatus which images a robot or objects around the robot; and
a robot control apparatus which controls motions of the robot based on processing results of the image processing apparatus,
wherein the robot control apparatus includes
  a first communication unit which communicates with an external computer, the first communication unit being configured to output an open command,
  a second communication unit which is connected to the image processing apparatus and a server via a network with a communication port,
  a command processing unit that is configured to control a communication port of the second communication unit based on the open command and that is configured to perform communication with the image processing apparatus and the server via the network, and
  a socket management unit that is configured to receive an instruction corresponding to the open command from the command processing unit to open the communication port and that is configured to connect the robot control apparatus to the image processing apparatus and the server via the network by using a port number of the communication port and an IP address of the robot control apparatus when the communication port is open, wherein
a first communication speed between the first communication unit and the external computer is slower than a second communication seed between the second communication unit and the image processing apparatus, and
a first communication cycle between the first communication unit and the external computer is larger than a second communication cycle between the second communication unit and the image processing apparatus.

* * * * *